United States Patent [19]
Kuramoto

[11] 4,227,705
[45] Oct. 14, 1980

[54] SEMICIRCULAR PLUG FOR PREVENTING LEAKAGE OF OIL IN A CYLINDER HEAD OF AN OVERHEAD CAM SHAFT ENGINE

[75] Inventor: Akio Kuramoto, Okazaki, Japan

[73] Assignee: Toyota Jidosha Kogyo Kabushiki Kaisha, Aichi, Japan

[21] Appl. No.: 958,396

[22] Filed: Nov. 7, 1978

[30] Foreign Application Priority Data

May 30, 1978 [JP] Japan ................................. 53-65561

[51] Int. Cl.[3] ................................................ F16J 15/02

[52] U.S. Cl. ................................ 277/160; 123/195 C; 123/198 E; 123/90.37; 277/189

[58] Field of Search .............................. 277/160, 180; 123/198 E, 195 C, 90.37, 195 S, 189

[56] References Cited

U.S. PATENT DOCUMENTS 2,085,457 6/1937 Westerhouse ........................ 277/160

*Primary Examiner*—Robert I. Smith
*Attorney, Agent, or Firm*—Oblon, Fisher, Spivak, McClelland & Maier

[57] ABSTRACT

A semicircular plug to be fitted in a semicircular recess formed in either end of a cylinder head of an overhead cam shaft engine for preventing leakage of lubricating oil. The semi-circular plug has a pin hole in the center of its outer periphery for receiving the upper portion of a pin bedded in a pin hole provided in the center of the semicircular recess.

2 Claims, 4 Drawing Figures

SEMICIRCULAR PLUG FOR PREVENTING LEAKAGE OF OIL IN A CYLINDER HEAD OF AN OVERHEAD CAM SHAFT ENGINE

BACKGROUND OF THE INVENTION

1. Field of the Invention

The present invention relates to a semicircular plug adapted to be fitted to a cylinder head of an overhead cam shaft engine for preventing leakage of lubricating oil from the cylinder head.

2. Description of the Prior Art

In a conventional overhead cam shaft engine as shown in FIG. 1, a plurality of bearings 2 are provided in the upper portion of a cylinder head 1 for receiving a cam shaft (not shown). A semicircular recess 3 is formed in either end 1*a* of the cylinder head 1 in axial alignment with the bearings 2 for passing the cam shaft through the bearings 2.

In order to make the engine ready for operation, lubricating oil is supplied to the bearings 2 for lubricating the cam shaft, and a substantially semicircular plug 4 of rubber is fitted in each recess 3 to prevent leakage of the lubricating oil.

The outer periphery 4*a* of the semicircular plug 4 is in contact with the inner surface of the recess 3 of the cylinder head 1 as shown in FIG. 2. However, the semicircular plug 4 is not fixed with respect to the recess 3 since there is no means for securing the plug 4 to the recess 3. Therefore, when the semicircular plug 4 is pressed by a cylinder head cover (not shown) against the cylinder head 1 through a gasket 5, it tends to move out of position and develop clearances such as those shown at $C_1$ and $C_2$ in FIG. 2 between the top of the cylinder head 1 and the bottom of the gasket 5, through which lubricating oil leaks out.

In another conventional construction, as shown in FIG. 3, the semicircular plug 4 has a projection 4*b* adapted to be inserted into a small hole 3*a* formed in the bottom of the recess 3 for preventing movement of the semicircular plug 4. In this construction, however, the semicircular plug 4 must be made of hard rubber to facilitate insertion of the projection 4*b* into the small hole 3*a* while the gasket 5 is made of soft material to prevent leakage of the lubricating oil from between the cylinder head 1 and the cylinder head cover. It is difficult for the gasket 5 to exert sufficient pressure against the semicircular plug 4 to maintain the same in a fluid-tight position, and a clearance such as that shown at $C_3$ in FIG. 3 is created between the gasket 5 and the cyliner head 1 through which lubricating oil leaks out.

SUMMARY OF THE INVENTION

The object of the present invention is to provide a semicircular plug for a cylinder head of an overhead cam shaft engine which can effectively prevent leakage of lubricating oil. The semicircular plug according to the present invention is easily located with respect to a recess in the cylinder head. Further, hardness of the material of the semicircular plug can optionally be determined, and it is completely pressed into fluid-tight position by a gasket of soft material.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
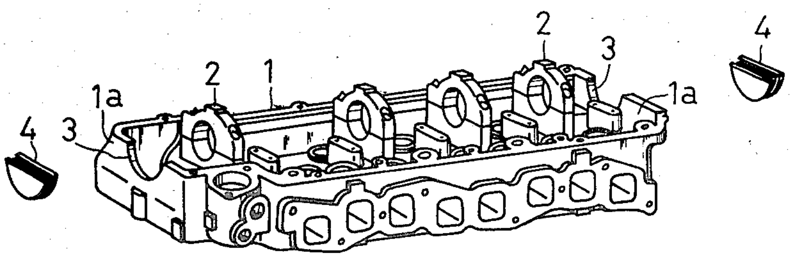
Fig.1 (PRIOR ART)
FIG. 1 is an exploded perspective view of a conventional cylinder head of an overhead cam shaft engine and a pair of semicircular plugs to be fitted thereto.
Figure 2:
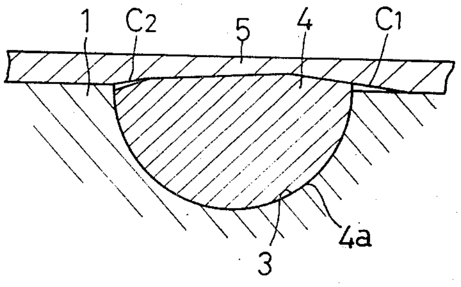
Fig.2 (PRIOR ART)
FIG. 2 is an enlarged fragmentary cross-sectional view showing a conventional semicircular plug fitted in a recess of a cylinder head.
Figure 3:
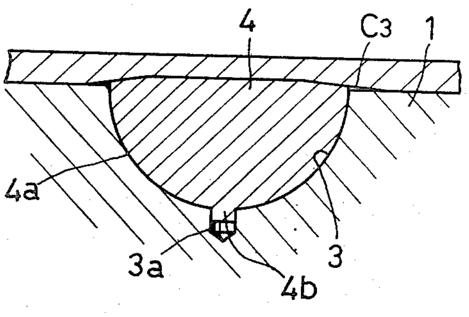
Fig.3 (PRIOR ART)
FIG. 3 is a view similar to FIG. 2 showing another conventional semicircular plug.
Figure 4:
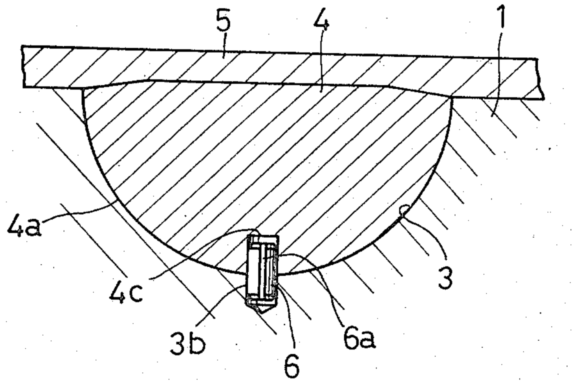
FIG. 4 is an enlarged fragmentary cross-sectional view showing an embodiment of the present invention.

Referring now to FIG. 4 of the drawings, a semicircular plug 4 has a semicircular outer periphery 4*a* fitted in a semicircular recess 3 formed in a cylinder head 1 of an overhead cam shaft engine and a pin hole 4*c* provided in the center of the outer periphery 4*a*. The semicircular recess has a pin hole 3*b* in its center, into which the lower portion of a cylindrical spring pin 6 having a longitudinal groove 6*a* is inserted under pressure. The upper portion of the cylindrical spring pin 6 is adapted to be received in the pin hole 4*b* in the semicircular plug 4. The spring pin 6 is beveled at its upper and lower ends for smooth insertion into the pin holes 4*c* and 3*b*.

When the semicircular plug 4 is fitted in the recess 3 with insertion of the upper portion of the spring pin 6 into the pin hole 4*c*, the semicircular plug 4 is properly located and fixed by the spring pin 6 with respect to the recess 3. Then the semicircular plug 4 is pressed against the cylinder head 1 by a gasket 5. Since the semicircular plug 4 is securely fixed to the recess 3 and will not move out of position, it is completely pressed and sealed by the gasket 5 to effectively prevent leakage of the lubricating oil from the cylinder head 1.

While the invention has been described with reference to a preferred embodiment thereof, it is to be understood that modifications or variations may be easily made without departing from the scope of the invention which is defined by the appended claims.

What is claimed is:

1. A semicircular plug assembly in a cylinder head, having a pinhole formed therein, of an overhead cam shaft engine having a plurality of bearings in the upper portion thereof comprising:
   - a semicircular plug fitted in a semicircular recess formed in either end of said cylinder head in axial alignment with said bearings, said semicircular plug having a semicircular outer periphery and a pin hole provided in the center of said outer periphery; and,
   - a pin bedded in said pin hole formed in said cylinder head in the center of said semicircular recess and received in said pin hole of said outer periphery of said semicircular plug.

2. The semicircular plug assembly as defined in claim 1 wherein said pin is a cylindrical spring pin having a longitudinal groove.

* * * * *